Jan. 21, 1936.  A. L. KLESSIG  2,028,221
AUTOMATIC HITCH
Filed Nov. 14, 1935  2 Sheets-Sheet 1
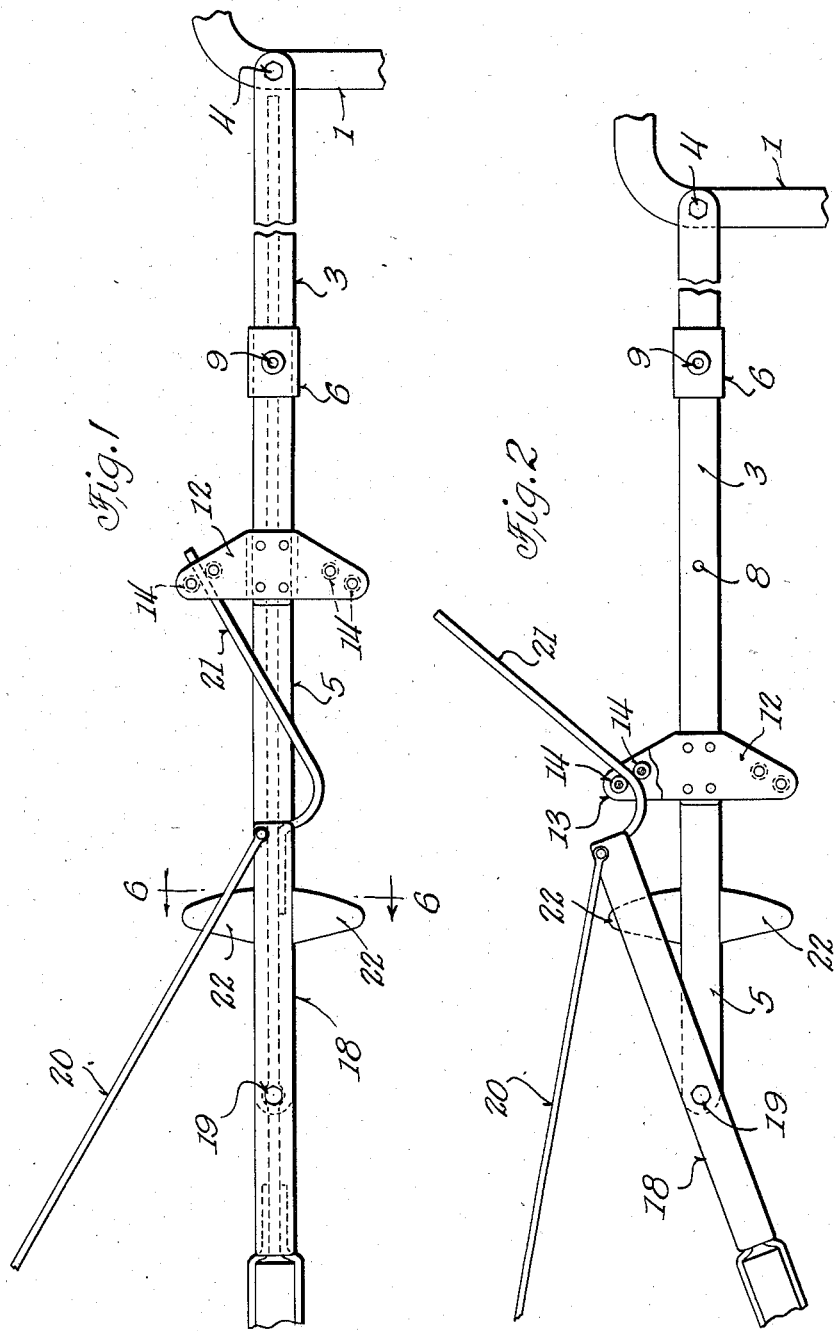
INVENTOR.
Arthur L. Klessig
BY
ATTORNEY.

Jan. 21, 1936. A. L. KLESSIG 2,028,221
AUTOMATIC HITCH
Filed Nov. 14, 1935 2 Sheets-Sheet 2
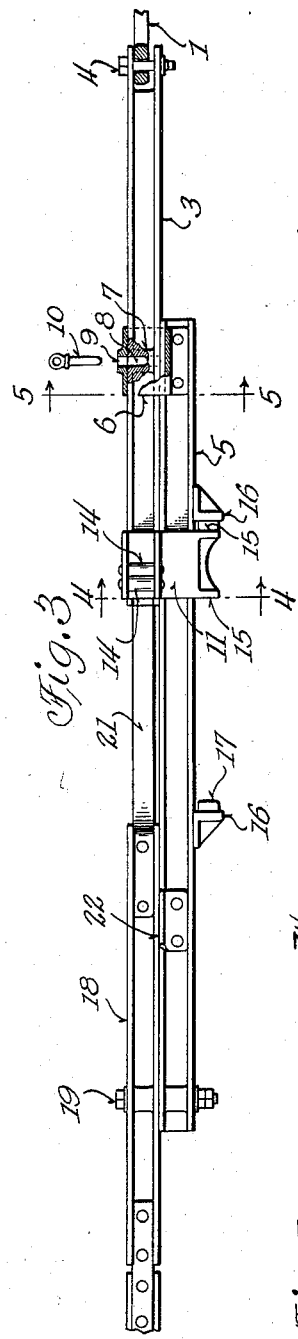
INVENTOR.
Arthur L. Klessig
BY
Arthur R. Woolfolk
ATTORNEY.

Patented Jan. 21, 1936

2,028,221

UNITED STATES PATENT OFFICE 2,028,221

AUTOMATIC HITCH

Arthur L. Klessig, Manitowoc County, Wis.

Application November 14, 1935, Serial No. 49,654

10 Claims. (Cl. 280—33.5)

This invention relates to automatic hitches and is particularly directed to an automatic hitch for connecting an implement, such as a harvesting device, binder or other apparatus of this type, to a tractor or other source of locomotion.

In harvesting, particularly in operating a binder, difficulty has been experienced in negotiating the turns in a field and a large amount of room is required to make the turns under ordinary conditions.

This invention is designed to overcome the above noted defects, and objects of this invention are to provide a novel form of automatic tractor hitch which is so made that the binder, for example, may be turned into a right angle position at the corner of a field in a very small amount of room, in which this turning of the binder is effected by a combined backing up and forward pulling of the tractor without any particular effort on the part of the operator, the automatic hitch assisting in turning the binder very short as the tractor backs and allowing the tractor at the same time during backing to turn into a more advantageous position.

The construction is such that when the tractor is again started forward, the automatic hitch straightens itself out and the binder is rocked into its final correct position so that it can approach the corner of the field and make a cut at right angles to its initial cut. This turning of the binder is effected without breaking down any of the grain whatsoever, either from the binder or from the tractor itself.

Further objects are to provide a construction which is substantially foolproof and requires no thought on the part of the operator leaving him free to manipulate the tractor in a very simple manner, the construction affording adequate strength both for the pulling and backing of the binder and also for the support of the binder.

Further objects are to provide an automatic hitch which may be quickly changed from a right to a left hitch so that the cutting of the field may progress either right-handed or left-handed as desired.

Further objects are to provide a construction which is rugged, which is simple, which is cheap to make, and which is easy to operate.

An embodiment of the invention is shown in the accompanying drawings, in which:

Figure 1 is a plan view of the automatic hitch with parts broken away and in section showing it in its extended or normal position.

Figure 2 is a view corresponding to Figure 1 showing the hitch as it appears when the tractor is backed.

Figure 3 is a side elevation of the structure shown in Figure 1 with parts in section.

Figure 4 is a sectional view on the line 4—4 of Figure 3.

Figure 5 is a sectional view on the line 5—5 of Figure 3.

Figure 6 is a sectional view on the line 6—6 of Figure 1.

Figure 7 is a view to a much reduced scale showing the tractor and binder in two positions in full lines, one position being the finish of one cut and the other position being the start of the succeeding cut, an intermediate position of the binder being indicated in dotted lines.

Referring to the drawings, particularly Figures 1, 2 and 3, I represents the draft member at the back of a tractor 2, see Figure 7. To this draft member a link 3 is pivotally attached as by means of the bolt 4, or in any other suitable removable manner.

Preferably the link 3 is of I-beam construction though obviously other shapes could readily be employed. This link is slidably mounted upon a body member 5 which may similarly be an I-beam. A guiding member 6 is rigidly secured to the member 5 and slidably receives the member 3, as most clearly shown in Figures 3 and 5. It is preferable to provide the member 3 with a reinforced or thickened intermediate portion 7 which is provided with an aperture 8 registering with an aperture 9 in the guide member 6 when the hitch is fully extended, as shown in Figures 1 and 3.

A pin 10 may be removably positioned within these apertures and thereby lock the member 3 to the member 5 when the automatic action of the hitch is not desired. Obviously the pin may be either detached from the device, as shown, or may be carried in any suitable manner as by a lever, for instance. It is seldom used—merely when it is desired to dispense with the automatic action of the hitch, as will appear hereinafter.

The rear end of the member 3 is provided with a guide member 11, see Figures 3 and 4, which is provided with upper and lower outwardly projecting flanges 12 and 13 between which pairs of rollers 14 are mounted. The rollers are set with their axes slightly staggered, as may be seen from Figures 1 and 2.

The guide member 11, see Figures 3 and 4, continues downwardly and is provided with a pair of downwardly projecting ears or shoulders 15 which strike against bumpers or stops indicated generally at 16.

These bumpers are each provided with rubber or other cushioning means 17, as may be seen from Figure 3, to thereby absorb the shock when the sliding motion of the member 3 with relation to the member 5 is arrested at either end of its stroke. Normally when the tractor is pulling forwardly, the parts are in the position shown in Figures 1 and 3, and the forward stop 16 transmits the pull of the tractor from the link 3 to the member 5.

An implement tongue member 18 is pivoted intermediate its ends, as indicated at 19, to the rear end of the member 5. This tongue member is attached to the binder in any suitable manner and a brace 20 extends from the implement, such as the binder, to the lever 18 to thereby assist in holding the lever 18 rigid with respect to the binder.

The member 18 is free to rock about the pivot point 19 and to thereby rock the binder, as will hereinafter appear. It is provided adjacent its forward end with a cam-shaped member which may consist of a heavy metal bar 21 which is set angularly with respect to the lever 18.

A pair of supporting wings 22 are rigidly secured to the member 5 and extend outwardly, as may be seen from Figures 1, 2 and 6, flush with the upper face of the member 5, and provide a support for the lever 18.

Hereinafter the member 5 will be called the body portion of the hitch, the member 3 the tractor link, and the member 18 the implement tongue.

The implement chosen to illustrate the operation of this invention has been diagrammatically shown as a binder and is indicated by the reference character 23 in Figure 7. The field of grain is indicated by the reference character 34.

The tractor and binder progress around the field either clockwise or counterclockwise, depending on the side from which the projecting cam member 21 extends. As shown in Figures 1, 2 and 7, the arrangement is for a counterclockwise travel of the tractor and binder around the field.

In using the device the operator merely drives the tractor straight along one side of the field, cutting the grain as he goes in the usual manner and the tractor pulls the binder into the position shown at the bottom portion of Figure 7, such position being generally indicated by the reference character A. The final position at the beginning of the next cut is indicated by the reference character B.

In order to rock the binder into position in the shortest possible space, this invention has been provided and the rocking of the binder into its position at right angles to its initial direction of travel is accomplished as indicated by the dot and dash lines in Figure 7. The dot and dash lines 24 and 25 indicate the path of travel of the bull wheel 26 of the binder 23. The dot and dash lines 27 and 28 indicate the path of travel of the right-hand front wheel of the tractor 2.

After the binder has arrived at the position A shown in Figure 7, the tractor is first backed and the front wheels are rocked so that the front wheel of the tractor travels along the line 27. This causes the tractor link 3 to slide backwardly with reference to the body portion 5 into the position shown in Figure 2, thus rocking the tongue lever or tongue member 18 into its angular position and consequently rocking the binder or implement into the dotted line position shown in Figure 7. Continued backing of the tractor with the right front wheel traveling along the path 27 causes the bull wheel of the binder to travel backwardly along the path 24. Thereafter the tractor is driven forwardly and the right front wheel thereof travels along the path 28. The bull wheel of the binder travels along the path 25 and it will be seen that the binder has made a very sharp turn as the tractor backs and comes into correct position for cutting the next adjacent side of the field.

It obviously would be within the scope of this invention to provide ball bearings or rollers between the parts 3 and 5 if desired, but this is not necessary and the parts will slide freely one upon the other and are suitably guided to prevent relative angular motion between the tractor link 3 and the body portion 5 of the automatic hitch.

If it is desired to operate a binder designed to travel around the field in a clockwise direction, all that is necessary is to remove the pivot bolt or pivot pin 19 and reverse the tongue member 18. This puts the cam member 21 on the opposite side from that it now occupies as shown in Figures 1 and 2.

In turning the binder around at right angles to its initial position at any corner of the field, it will be seen that all that is necessary is to draw the binder straight ahead past the corner last cut and thereafter back the tractor and turn it, as has been shown in Figure 7, subsequently driving the tractor straight forward, the automatic hitch causing the binder to sharply rock into its correct position, and as the tractor straightens the hitch out, the lever 18 will rock back into alignment with the body portion 5. The tractor link always stays in alignment with the body portion 5, though it may slide thereon, as has heretofore been described.

If it is desired to prevent the automatic action of the hitch, any suitable locking means whatsoever may be provided between the members 3 and 5. A simple form has been shown in Figure 3 in which the pin 10, which is normally removed, may be inserted into the apertures 8 and 9 and thus lock the parts 3 and 5 together, thereby providing a rigid non-rocking and non-automatic hitch.

It is to be seen that the automatic hitch is such that as the tractor backs, the implement, such as the binder, is automatically rocked angularly from its initial position and this rocking may be enhanced by backing the tractor along the curved path 27, see Figure 7. Thereafter when the tractor draws straight ahead, the binder is rocked into its correct position, as shown in the position of the tractor and binder indicated by the reference character B in Figure 7.

While the parts have been shown as formed of metal, it is obviously within the province of this invention to form them of wood if so desired. However, even though the parts are formed of metal, they need not be very heavy as the I-beam construction provides the requisite strength. Further it is to be noted that there is considerable downward pressure on the tongue lever 18 as the binders tend to tip forward, but this downward pressure is resisted by the extended bearing plates 22 carried by the body portion 5, as shown in Figures 1, 2 and 6.

It will therefore be seen that an automatic hitch has been provided for use between a source of locomotion, such as a tractor, and an implement, such, for instance, as a binder, which is so made that it allows the implement to be turned at a sharp angle to its initial position and in a very small space to thereby allow cutting successive sides of a field without breaking the grain down and without requiring much room.

Although this invention has been described in considerable detail, it is to be understood that such description is intended as illustrative rather than limiting, as the invention may be variously embodied and is to be interpreted as claimed.

I claim:

1. An automatic hitch adapted to be interposed between a draft device and a drawn implement, said hitch comprising a body portion, a draft link slidably guided on said body portion and normally occupying an extended forward position with reference to said body portion, a tongue member pivotally mounted adjacent the rear end of said body portion, and automatically acting means for rocking said tongue member about its pivot on said body portion when said draft link is slid backwardly with respect to said body portion.

2. An automatic hitch adapted to be interposed between a draft device and a drawn implement, said hitch comprising a body portion, a draft link slidably guided on said body portion and normally occupying an extended forward position with reference to said body portion, a tongue member pivotally mounted adjacent the rear end of said body portion, and cam means for rocking said tongue member about its pivot on said body portion when said draft link is slid backwardly with respect to said body portion.

3. An automatic hitch adapted to be interposed between a draft device and a drawn implement, said hitch comprising a body portion, a draft link slidably guided on said body portion and normally occupying an extended forward position with reference to said body portion, a tongue member pivotally mounted adjacent the rear end of said body portion, automatically acting means for rocking said tongue member about its pivot on said body portion when said draft link is slid backwardly with respect to said body portion, and guides for slidably holding said draft link and body portion together.

4. An automatic hitch adapted to be interposed between a draft device and a drawn implement, said hitch comprising a body portion, a draft link slidably guided on said body portion and normally occupying an extended forward position with reference to said body portion, a tongue member pivotally mounted adjacent the rear end of said body portion, automatically acting means for rocking said tongue member about its pivot on said body portion when said draft link is slid backwardly with respect to said body portion, guides for slidably holding said draft link and body portion together, and bumpers for limiting the forward and backward sliding of said draft link.

5. An automatic hitch adapted to be interposed between a draft device and a drawn implement, said hitch comprising a body portion, a draft link slidably guided on said body portion and normally occupying an extended forward position with reference to said body portion, a tongue member pivotally mounted adjacent the rear end of said body portion, automatically acting means for rocking said tongue member about its pivot on said body portion when said draft link is slid backwardly with respect to said body portion, guides for slidably holding said draft link and body portion together, and bumpers for limiting the forward and backward sliding of said draft link, said bumpers having means for cushioning said draft link to avoid shock at the limit of the forward and backward sliding motion of said draft link.

6. An automatic hitch adapted to be interposed between a draft device and a drawn implement, said hitch comprising a draft link for attachment to said draft device, a body portion slidably guiding said draft link, a tongue lever for attachment to said drawn implement, said tongue lever being pivotally mounted upon said body portion, and cam means directly and operatively coupling said draft link and said tongue lever for rocking said tongue lever upon backward sliding motion of said draft link.

7. An automatic hitch adapted to be interposed between a draft device and a drawn implement, said hitch comprising a draft link for attachment to said draft device, a body portion slidably guiding said draft link, a tongue lever for attachment to said drawn implement, said tongue lever being pivotally mounted upon said body portion, cam means operatively coupling said draft link and said tongue lever for rocking said tongue lever upon backward sliding motion of said draft link, and removable means for temporarily locking said draft link against sliding motion with reference to said body portion.

8. An automatic hitch adapted to be interposed between a draft device and a drawn implement, said hitch comprising a body portion, a draft link slidably mounted on said body portion and having laterally projecting cam guiding means, an implement tongue lever pivotally mounted upon said body portion, and cam means carried by said implement tongue and cooperating with the said cam guiding means.

9. An automatic binder hitch comprising a tongue lever rigidly attached to the binder, a draft link for pivotal attachment to a tractor, a body portion slidably receiving said draft link, bumpers for limiting the forward and rear sliding of said draft link with respect to said body portion, said tongue lever being pivotally mounted adjacent the rear end of said body portion, bearing plates extending laterally from said body portion upon which said tongue lever is adapted to rest when said tongue lever is angularly rocked, and cam means interposed between said draft link and said tongue lever for rocking said tongue lever when said draft link is slid rearwardly with respect to said body portion.

10. A binder hitch adapted to be positioned between a tractor and a binder comprising a body portion, a tongue lever rigidly attached to said binder and pivotally mounted adjacent the rear end of said body portion, bracing means extending from said tongue lever to said binder, an angularly projecting arm carried by the forward end of said tongue lever, a draft link connected to said tractor and slidably carried by said body portion, and guiding means receiving said angularly directed arm and rigidly carried by said draft link, whereby when said draft link is slid rearwardly with respect to said body portion upon backing of said tractor said binder is angularly turned with reference to the body portion of said binder hitch.

ARTHUR L. KLESSIG.